(12) United States Patent
Bates et al.

(10) Patent No.: US 7,756,849 B2
(45) Date of Patent: *Jul. 13, 2010

(54) METHOD OF SEARCHING FOR TEXT IN BROWSER FRAMES

(75) Inventors: Cary Lee Bates, Rochester, MN (US); Steven Paul Jones, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 327 days.

This patent is subject to a terminal disclaimer.

(21) Appl. No.: 11/855,180

(22) Filed: Sep. 14, 2007

(65) Prior Publication Data

US 2008/0005089 A1  Jan. 3, 2008

Related U.S. Application Data

(63) Continuation of application No. 09/882,917, filed on Jun. 15, 2001, now Pat. No. 7,310,627.

(51) Int. Cl.
*G06F 17/30* (2006.01)
(52) U.S. Cl. .................................................. 707/705
(58) Field of Classification Search ............... 707/1, 707/102; 715/856
See application file for complete search history.

(56) References Cited

U.S. PATENT DOCUMENTS

| 5,297,249 | A | * | 3/1994 | Bernstein et al. | 715/854 |
|---|---|---|---|---|---|
| 5,388,993 | A | | 2/1995 | McKiel et al. | |
| 6,009,429 | A | | 12/1999 | Greer et al. | |
| 6,021,416 | A | | 2/2000 | Dauerer et al. | |
| 6,031,989 | A | | 2/2000 | Cordell | |
| 6,044,387 | A | * | 3/2000 | Angiulo et al. | 715/257 |
| 6,230,171 | B1 | | 5/2001 | Pacifici et al. | |
| 6,247,018 | B1 | * | 6/2001 | Rheaume | 707/102 |

(Continued)

*Primary Examiner*—Etienne P LeRoux
(74) *Attorney, Agent, or Firm*—Patterson & Sheridan, LLP

(57) ABSTRACT

Methods, systems and articles of manufacture for searching content in frames. In general, information located at one or more networked addresses may be displayed to a user in two or more frames. The content of a frame may be searched by designating one frame as a default search frame. Such a designation may be made according to a tag or other criteria, such as attributes of the frame itself or historical information pertaining to a previous search of one of the active frames. In any case, the designation of a default search frame eliminates the need for explicit selection by the user prior to a search.

24 Claims, 3 Drawing Sheets

U.S. PATENT DOCUMENTS

| | | |
|---|---|---|
| 6,266,684 B1 | 7/2001 | Kraus et al. |
| 6,288,702 B1 | 9/2001 | Tachibana et al. |
| 6,449,624 B1 | 9/2002 | Hammack et al. |
| 6,542,515 B1 | 4/2003 | Kumar et al. |
| 6,593,944 B1 | 7/2003 | Nicolas et al. |
| 6,657,647 B1 * | 12/2003 | Bright ................ 715/856 |
| 6,658,626 B1 | 12/2003 | Aiken |
| 6,681,368 B1 | 1/2004 | Kawabata |
| 6,718,518 B1 | 4/2004 | Plow et al. |
| 6,736,642 B2 | 5/2004 | Bajer et al. |
| 6,785,891 B1 | 8/2004 | Allen et al. |
| 6,801,906 B1 | 10/2004 | Bates et al. |
| 6,907,574 B2 | 6/2005 | Xu et al. |
| 6,943,795 B1 | 9/2005 | Matsui et al. |
| 7,107,275 B2 | 9/2006 | Quinn et al. |
| 7,107,591 B1 * | 9/2006 | Karp et al. ................ 718/104 |
| 7,190,976 B2 | 3/2007 | Enns et al. |
| 7,310,627 B2 * | 12/2007 | Bates et al. ................ 707/1 |
| 2002/0054126 A1 | 5/2002 | Gamon |
| 2002/0120505 A1 | 8/2002 | Henkin et al. |
| 2002/0129064 A1 | 9/2002 | Guthrie |
| 2002/0147634 A1 | 10/2002 | Jacoby et al. |

* cited by examiner

METHOD OF SEARCHING FOR TEXT IN BROWSER FRAMES

CROSS-REFERENCE TO RELATED APPLICATIONS

This application is a continuation of U.S. patent application Ser. No. 09/882,917 filed Jun. 15, 2001 now U.S. Pat. No. 7,310,627, and is herein incorporated by reference.

BACKGROUND OF THE INVENTION

1. Field of the Invention

The present invention generally relates to data processing. More particularly, embodiments are provided for searching content in frames.

2. Description of the Related Art

In recent years, the popularity of the Internet has grown dramatically. One reason for such growth is the accessibility of voluminous information including text, audio and video.

In general, the information available from the Internet (and some other networks) is in the form of electronic documents. In the context of the World Wide Web (a particularly useful aspect of the Internet), a website is made up of one or more electronic documents located on a given host. All websites taken together constitute the World Wide Web (WWW). A Web document is located at an address represented by a URL, and may reside on a user's own computer, or on another computer networked with the user's computer. In particular, the document may reside on a networked computer (called a host) with an Internet address.

Once a Web page is made available on the World Wide Web via a server, any client connected to the World Wide Web can access the page using a software interface known as a browser. Access is typically accomplished by typing the URL in the appropriate browser field (or retrieving the address from a file, such as a bookmark file). After the URL has been entered, the browser requests the server to send the HTML file.

Web documents are generally formatted in a markup language such as HyperText Markup Language (HTML), Extensible Markup Language (XML) and Wireless Markup Language (WML). Such markup languages describe document appearance, document layout and hyperlink specifications. A markup language defines the syntax that describes the structure and the content of a document including text, images, and other supported media. Using markup language, a Web page can be created which contain, bitmap images, graphic images, text of various styles and sizes, and other formatting attributes and contents.

One formatting tool made available by markup languages, such as HTML, is a "frame." Frames are formatting features allowing a browser window to be divided into multiple display areas, each containing a different document. A frame may contain any valid content that a browser is capable of displaying, including multimedia. If a frame's contents include a hypertext link the user selects, the new document's contents may replace that same frame, another frame's content, or the entire browser window. Frames are defined in a special HTML document in which the <body> tag is replaced with one or more <frameset> tags that tell the browser how to divide its main window into discrete frames. Special <frame> tags go inside the <frameset> tag and point to the documents that go inside the frames.

A problem occurs when a user desires to search for text in a window containing multiple frames. Because each frame in a window is essentially an independent, non-overlapping electronic document, the user must first select one frame to be searched. Selection is typically made by clicking on a frame with a mouse pointer. Once a frame has been selected, the user enters search string into a dialog box, typically invoked by a "find text" menu item. The user may also select other search criteria, such as searching only uppercase words or making the search case insensitive. The content of the selected frame is then searched for text matching the search terms and criteria.

In some cases, inexperienced users may be unfamiliar with the foregoing frame selection requirement necessary for a frame search. As a result, users become frustrated with the inability to invoke the "find text" dialog box. Even if the find function is available, the user may have unwittingly selected the wrong frame to search. Even experienced users find it inconvenient to select a frame manually prior to initiating a search.

Therefore, there is a need for a method and system for facilitating frame content searches within a multiple frames environment.

SUMMARY OF THE INVENTION

Embodiments of the present invention provide methods, systems and articles of manufacture for searching content in frames. In one embodiment, a method of formatting an electronic document comprising at least two frames each containing searchable text is provided. The method comprises receiving a response containing the electronic document, automatically designating one of the at least two frames as a default search frame, rendering the electronic document for display.

In another embodiment, a computer readable medium comprises a network navigation program which, when executed by a processor, causes steps comprising parsing a response containing an electronic document formatted with at least two frames each containing searchable content and automatically designating one of the at least two frames as a default search frame. The electronic document may then be rendered for display.

Another embodiment provides a computer readable medium comprising a digital document comprising a format code segment and a default search frame code segment. When executed by a processor configured with a program, the format code segment formats the digital document with at least two frames containing searchable content and the default search frame code segment designates one of the two frames as a default search frame.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention provide methods, systems and articles of manufacture for searching content in frames. In general, information located at one or more networked addresses may be displayed to a user in two or more frames. One of the frames may be automatically designated as a default search frame. Such a designation may be made according to a tag or other criteria, such as attributes of the frame itself or historical information pertaining to a previous search of one of the active frames. In any case, the designation of a default search frame eliminates the need for explicit selection by the user prior to a search.

One embodiment of the invention is implemented as a program product for use with a computer system such as, for example, the environment 100 shown in FIG. 1 and described below. The program(s) of the program product defines functions of the embodiments (including the method described below with reference to FIG. 3) and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
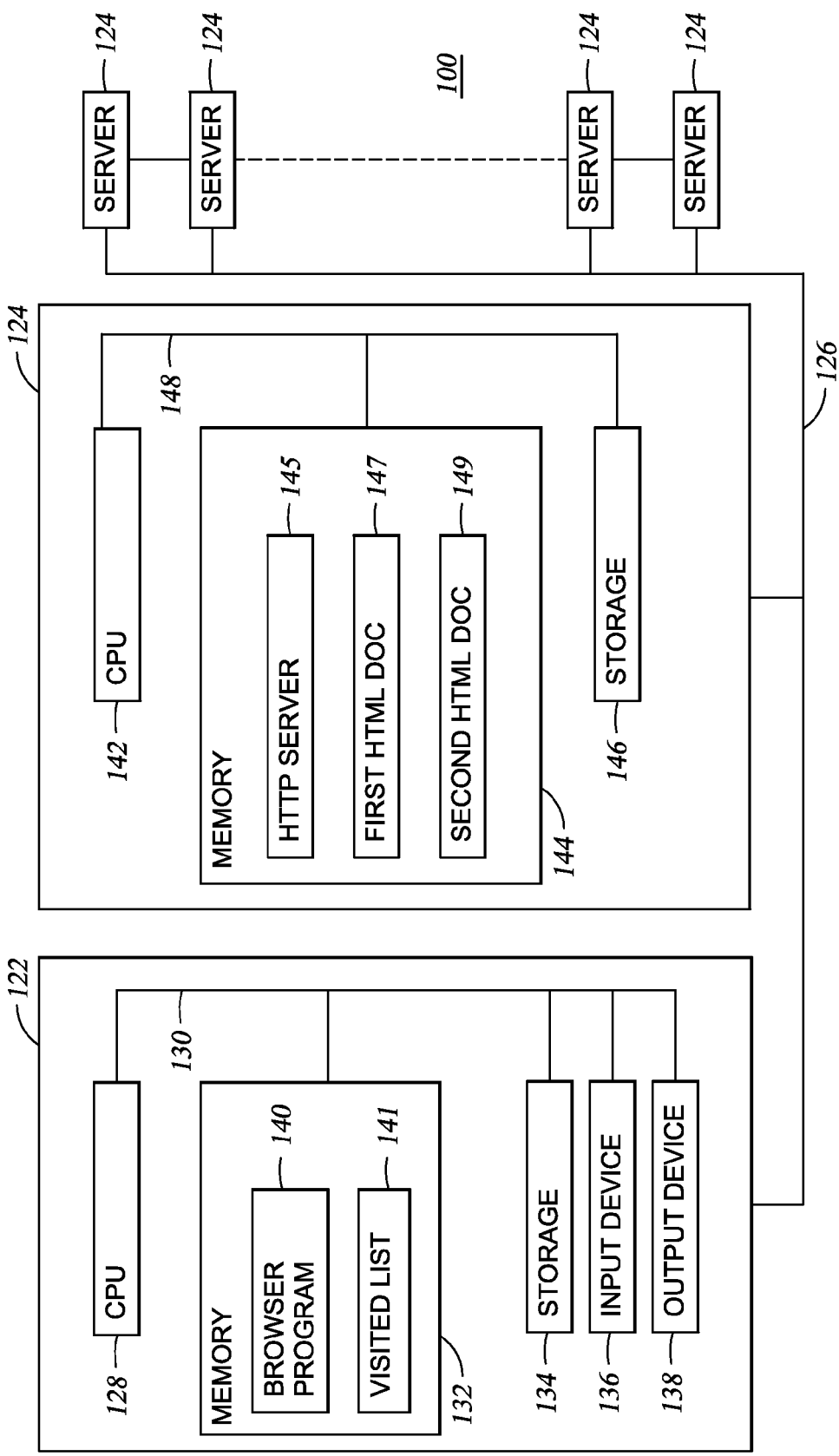
FIG. 1 is a high-level diagram of a data processing system.

FIG. 1 depicts a data processing system 100 that allows browsing information located at network addresses. Although a specific hardware configuration is shown for data processing system 100, embodiments of the present invention can apply to any hardware configuration that allows the browsing of documents, regardless of whether the computer system is a complicated, multi-user computing apparatus, a single-user workstation, or a network appliance that does not have non-volatile storage of its own.

In general, the data processing system 100 includes a client computer 122 and at least one server computer 124 (five such servers 124 are shown). The client computer 122 and the server computer 124 may be components of the same computer system or may be separate components connected via a network connection 126. In one embodiment, the network 126 comprises the Internet. The client computer 122 includes a Central Processing Unit (CPU) 128 connected via a bus 130 to memory 132, storage 134, input device 136 and output device 138. The input device 136 can be any device to give input to the client computer 122. For example, a keyboard, keypad, light pen, touch screen, button, mouse, track ball, or speech recognition unit could be used. The output device 138 may be any conventional display screen and, although showing separately from the input device 136, the output device 138 and input device 136 could be combined. For example, a display screen with an integrated touch screen, and a display with an integrated keyboard, or a speech recognition unit combined with a text speech converter could be used.

Memory 132 is preferably a random access memory sufficiently large to hold the necessary programming and data structures of the invention. While memory 132 is shown as a single entity, it should be understood that memory 132 may in fact comprise a plurality of modules, and that the memory 132 may exist at multiple levels, from high speed registers and caches to lower speed but larger DRAM chips. The memory 132 contains a browser program 140 that, when executed on the CPU 128, provides support for navigating between the various servers 124 and locating addresses at one or more of the servers 124. The contents of memory 132 can be loaded from and stored to the storage 134 as CPU 128 has a need for it.

The contents of memory 132 include a client navigation program 140 (also referred to as the "browser 140"). The browser 140 can be integrated with the operating system of the client computer 122, or can be a separate application. The browser program 140 may be initiated by a user on the client computer 122 and used to navigate between the servers 124. The documents accessible by the browser program 140 may reside on the client computer 122 or on the network of servers 124. For illustration, one embodiment of the invention is described in the context of the distributed system (such as the one shown in FIG. 1) wherein the browser 140 retrieves and renders remotely located electronic documents. After parsing the retrieved documents, the browser 140 may render the documents in a viewable format to a user using the output device 138.

Memory 132 also includes a visited list 141. In general, the visited list 141 is any data structure configured to contain network addresses (e.g., URLs) which have been previously visited by a user using the browser 140. Although shown separately, the visited list 141 may be a module of the browser 140.

In the preferred embodiment, storage 134 is DASD (Direct Access Storage Device), although it could be other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Memory 132 and storage 134 could be part of one virtual address space spanning multiple primary and secondary storage devices.

Each server computer 124 generally comprises a CPU 142, memory 144, and storage 146 coupled to one another by a bus 148. The storage 146 is provided for long-term storage of implementation code and data needed during operation. The memory 144 is random access memory sufficiently large to hold the necessary programming and data structures that are located on the server computer 124 according to a network information address, e.g., a URL. As shown, the memory 144 includes an HTTP server process 145 adapted to service requests from the client computer 122 regarding electronic documents. A first electronic document 147 and a second electronic document 149 are shown residing in the memory 144. Illustratively, the first and second electronic documents 147, 149 are HTML documents. More generally, the first and second electronic documents 147, 149 may be any electronic documents containing instructions that can be rendered by the browser 140. Although shown residing on the same server 124, the first and second electronic documents may be located on separate servers 124. The programming and data structures may be accessed and executed by the CPU 142 as needed.

To display the HTML documents 147, 149, the browser 140 relies on HTML commands embedded in the HTML documents. These commands are referred to as "tags". The tags indicate features or elements of a page and cause the browser to perform various functions, such as a particular type of formatting. HTML tags can be identified in HTML files by their syntax. That is, the tags are surrounded by left angle brackets (initiating a tag function) and right angle brackets (turning the tag function off). The first word in a tag is its formal name, which is typically descriptive of its function. Any additional words in a tag are special attributes, sometimes with an associated value after an equal sign (=), which further define or modify the tag's actions. For example, a tag and attribute combination may define background color, background audio, inline images, a hyperlink, the beginning of a new paragraph and the like.

In one embodiment, at least one of the HTML documents 147, 149 is a multi-frame document (e.g., a frame-based Web page) formatted with a SEARCHFRAME tag. An illustrative SEARCHFRAME tag is shown below in Table I.

TABLE I

| | |
|---|---|
| 001 | <FRAMESET ROWS = 40%, °> |
| 002 | <FRAMESET SRC = "frame1.html"> |
| 003 | <FRAMESET SRC = "frame2.html" SEARCHFRAME> |
| 004 | <FRAMESET SRC = "frame3.html"> |

In Table I, three frames are defined (as shown by lines 002-004) for a window. Illustratively, the FRAMESET tag for "frame2" includes a SEARCHFRAME attribute. The SEARCHFRAME attribute indicates to the browser 140 that the frame2 is the default search frame when the page is rendered.

Figure 2:
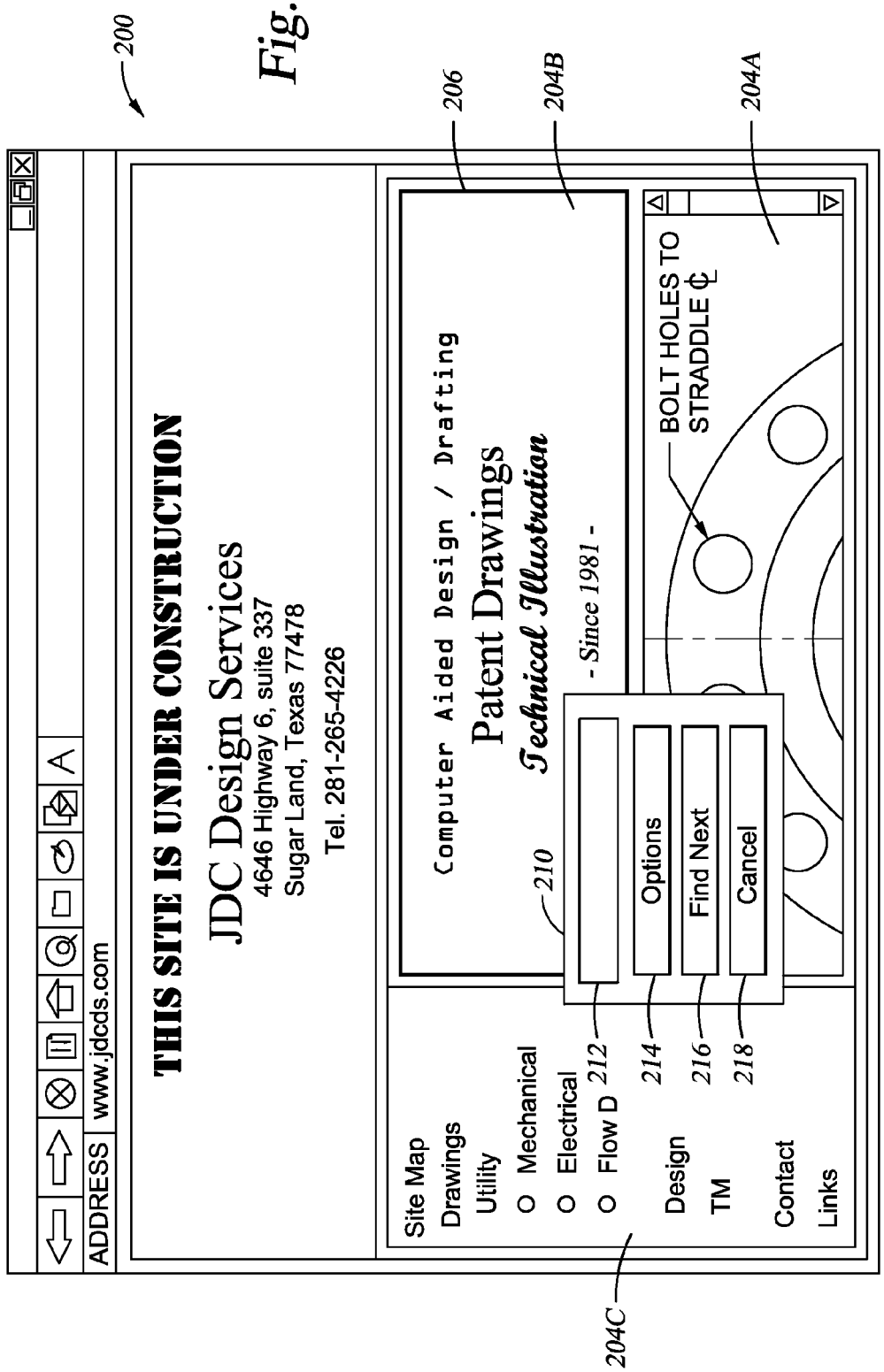
FIG. 2 is a graphical user interface for a browser.

FIG. 2 is an illustrative browser interface 200 for the browser 140. The browser interface 200 defines a window containing three frames 204A-C. Illustratively, the three frames 204A-C represent the frames defined in the HTML code of Table I. Accordingly, a second frame 204B represents the default search frame, "frame2", defined at lines 003 of Table I. The frame 204B is formatted with a highlighted border 206 to indicate to a user which of the three frames is the default search frame. However, it is understood that highlighting is merely one embodiment for indicating the default search frame.

A dialog box 210 is shown over the second frame 204B. The dialog box 210 is invoked in response to a user-initiated "Find" request. The dialog box 210 is configured with a text window 212, an Options button 214, a "Find Next" button 216, and a Cancel button 218. A user may enter a search string into the text window 212 and then click on the "Find Next" button 216 to initiate a search of the content in the second frame 204B. The find operation may be customized by clicking on the Options button 214 which provides the user with options including making the search case-sensitive or case-insensitive, etc.

Figure 3:
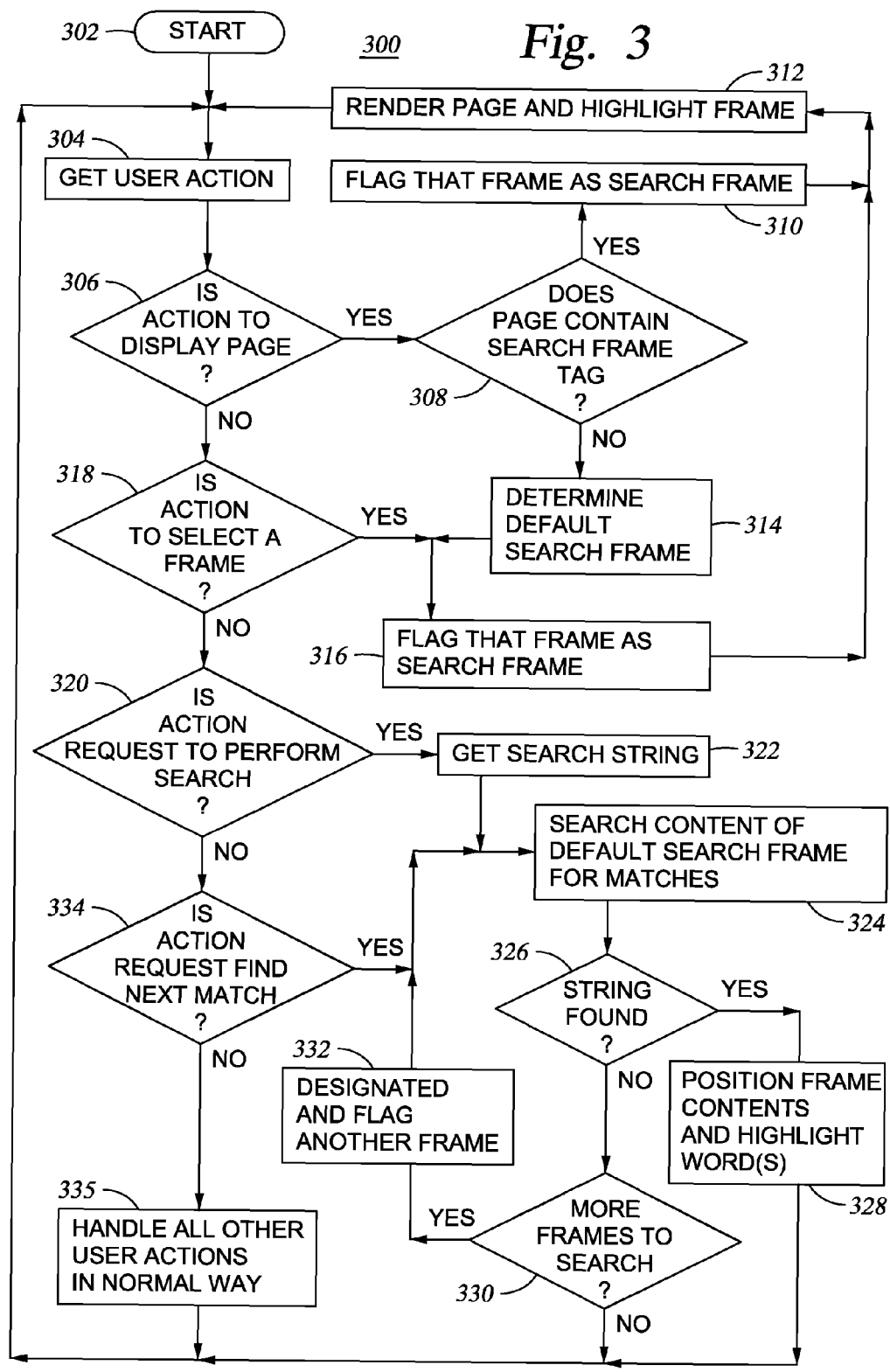
FIG. 3 is a flow diagram illustrating a method for rendering pages at network addresses and for searching content of frames.

FIG. 3 shows a method 300 illustrating the handling of user actions which may be performed while navigating network addresses on the data processing system 100 and/or searching the content of frames in an electronic document. In one embodiment, the method 300 illustrates the operation of the browser 140.

The method 300 is entered at step 302 and proceeds to step 304 to get a user action. At step 306, the method 300 determines whether the action is to display a page. An action to display a page may be invoked by, for example, clicking on a hypertext link or entering a URL into the address window of the browser interface. In either case, the appropriate information is retrieved from the source location (e.g., a Web server) and then parsed by the browser 140. If step 306 is answered affirmatively, the method 300 queries (step 308) whether the page contains a SEARCHFRAME tag. If so, the frame for which the tag is defined is flagged as the default search frame (step 310). At step 312, the page is rendered and the default search frame is highlighted (or otherwise formatted to indicate the frame to the user). The method 300 then returns to step 304.

If, at step 308, the page does not contain a SEARCH-FRAME tag, processing continues with step 314 where the default search frame is determined according to other criteria. In one embodiment, the default search frame is determined according to size. For example, the largest frame may be designated as the default search frame. This designation is premised on the assumption that the largest frame is more likely to be searched by the user. In another embodiment, the designation of the default search frame is made according to the frame having the most searchable content. In yet another embodiment, the frame configured with a scroll bar is selected as the default search frame, in the event that only one frame has a scroll bar. In still another embodiment, the designation of the default search frame is made according to a previous user selection. Previous user selections of a search frame for a particular page may be stored in the previously visited list 141. Accordingly, at step 314, the previously visited list 141 may be accessed to determine the default search frame.

Regardless of the particular manner in which the default search frame is determined at step 314, the selected frame is then flagged at step 316. Processing continues at step 312 where the page is rendered and the frame is highlighted. The method 300 then returns to step 304 to get another user action.

Returning to step 306, if the action is not to display a page, the method 300 proceeds to step 318 and queries whether the action is to select a frame. Selection of a frame may be accomplished, for example, by clicking on the frame with a mouse pointer. If step 318 is entered affirmatively, the selected frame is flagged as the default search frame at step 316. In addition, the flagged frame may be stored to the visited list 141 for future reference. The page is rendered and the frame is highlighted at step 312.

If, however, step 318 is entered negatively, the method 300 proceeds to step 320 and queries whether the user action is a request to perform a search of content in a frame. If so, the search string is retrieved at step 322. At step 322, the default search frame is searched for content matching the search string. At step 326, the method 300 queries whether a match was found. If so, the content is highlighted and positioned in the frame to be viewable by a user. Processing then returns to step 304 to get another user event. If, however, no matches are found at step 326, the method 300 queries (step 330) whether the active browser window contains more frames and whether the user has indicated a desire to search each of the frames. Such a desire may be indicated, for example, when the user selects a "search all" option made available by the browser 140. If step 330 is entered negatively, the method 300 returns to step 304. Otherwise, processing proceeds to step 332 where another frame is designated and flagged as the default search frame. Designation of a frame at step 332 may be performed in the manner described above with reference to step 314. As such, multiple iterations of frame selection may occur in a given window. For example, if a first frame was designated by size (e.g. the largest frame), then a subsequent designation at step 332 may result in designating the next largest frame. Processing then continues with step 324, which has been described above.

Returning to step 320, if the user action is not to perform a search, the method 300 proceeds to step 334 to query whether the user action is a request to find the next match (for a search string) in a frame. If so, processing proceeds with step 324, which has been described above. Otherwise, the method 300 proceeds to step 336 where all other user actions are handled according to the rules of the data processing system 100.

It is noted that the order of the steps of method 300 is merely illustrative and may be rearranged in other embodiments. In particular, the steps of designating a default search frame and rendering a page are interchangeable. In addition, the automatic designation of a frame may be used to advantage in manners other than for content searching purposes. For example, the designated frame may be a default printable frame.

While the foregoing is directed to embodiments of the present invention, other and further embodiments of the invention may be devised without departing from the basic scope thereof, and the scope thereof is determined by the claims that follow.

What is claimed is:

1. A method of formatting an electronic document comprising at least two frames each containing searchable text, comprising:
   receiving a response containing the electronic document comprising the at least two frames each containing the searchable text;
   automatically designating one of the at least two frames as a default search frame based on a pre-existing specification of the default search frame, wherein the designation is made irrespective of a listed order of the frames; and
   rendering the electronic document for display; wherein the designated default search frame of the displayed electronic document is available to a user for conducting a search of the searchable text contained in the designated default search frame and wherein, absent a command from the user to search a different one of the at least two frames, a user request to perform a search is, by default, automatically initiated in the designated default search frame.

2. The method of claim 1, wherein the electronic document is a web page, wherein the response is received from the Internet and wherein at least the automatically designating and rendering are performed by a browser.

3. The method of claim 1, wherein automatically designating occurs one of before rendering and after rendering.

4. The method of claim 1, wherein automatically designating occurs without an explicit selection of the default search frame by a user.

5. The method of claim 1, wherein automatically designating comprises parsing the response to locate a default search frame identifier.

6. The method of claim 1, wherein automatically designating comprises selecting from the at least two frames a frame previously selected for a content search, wherein the frame was previously selected during a previous visit to the electronic document.

7. The method of claim 1, wherein automatically designating comprises selecting from the at least two frames according to an attribute of the at least two frames.

8. The method of claim 1, further comprising highlighting the default search frame.

9. The method of claim 1 further comprising:
   receiving a request for a text search to be performed; and
   as a result of the automatic designation, initiating the text search in the default search frame as opposed to any of the other at least two frames.

10. A computer readable storage medium, comprising a network navigation program which, when executed by a processor, causes steps comprising:
   parsing a response containing an electronic document formatted with at least two frames each containing searchable content; and
   automatically designating one of the at least two frames as a default search frame based on a pre-existing specification of the default search frame.

11. The computer readable storage medium of claim 10, wherein automatically designating is performed using information contained in at least one of the electronic document and a data structure stored locally on a machine executing the network navigation program.

12. The computer readable storage medium of claim 10, wherein automatically designating occurs without an explicit selection of the default search frame by a user.

13. The computer readable storage medium of claim 10, wherein the electronic document is a hypertext markup language (HTML) Web page and the network navigation program is a Web browser.

14. The computer readable storage medium of claim 10, wherein automatically designating comprises parsing the response to locate a default search frame tag.

15. The computer readable storage medium of claim 10, wherein automatically designating comprises accessing a data structure containing data representing a previous selection of one of the at least two frames.

16. The computer readable storage medium of claim 10, further comprising highlighting the default search frame.

17. The computer readable storage medium of claim 10, further comprising rendering the electronic document for display.

18. The computer readable storage medium of claim 17, wherein automatically designating occurs one of before rendering and after rendering.

19. The computer readable storage medium of claim 17, wherein at least the automatically designating and rendering are performed by a browser.

20. A computer readable storage medium comprising a digital document comprising (i) a format code segment which, when executed by a processor configured with a program, formats the digital document with at least two frames containing searchable content and (ii) a default search frame code segment which, when executed by the processor, designates one of the two frames as a default search frame based on a pre-existing specification of the default search frame.

21. The computer readable storage medium of claim 20, wherein the program is a browser and the default search frame code segment is an HTML tag.

22. The computer readable storage medium of claim 20, wherein at least one of the format code segment and the default search frame code segment is hypertext markup language (HTML).

23. The computer readable storage medium of claim 20, wherein the default search frame code segment is an attribute of a FRAMESET tag.

24. The computer readable storage medium of claim 20, wherein the default search frame is configured to be highlighted when rendered by the program.

* * * * *